United States Patent [19]

Weber, III

[11] Patent Number: 5,492,643
[45] Date of Patent: Feb. 20, 1996

[54] ENVIRONMENTALLY SAFER REPLACEMENT REFRIGERANT FOR FREON 12-BASED REFRIGERATION SYSTEMS

[75] Inventor: Harrison M. Weber, III, Baton Rouge, La.

[73] Assignee: Kenneth B. Ruello, Jr., New Orleans, La.

[21] Appl. No.: 233,444

[22] Filed: Apr. 26, 1994

[51] Int. Cl.$^6$ .......................... C09K 5/04; C10M 101/00
[52] U.S. Cl. .................. 252/68; 252/67; 62/114
[58] Field of Search .......................... 252/67, 68; 62/114

[56] References Cited

U.S. PATENT DOCUMENTS

| | | | |
|---|---|---|---|
| 4,810,403 | 3/1989 | Bivens et al. | 252/67 |
| 4,971,712 | 11/1990 | Gorski et al. | 252/68 |
| 4,983,312 | 1/1991 | Tamura et al. | 252/67 |
| 5,145,594 | 9/1992 | Anton et al. | 252/68 |
| 5,254,280 | 10/1993 | Thomas et al. | 252/68 |
| 5,384,057 | 1/1995 | Wilczek | 252/68 |

FOREIGN PATENT DOCUMENTS 430131  6/1991  European Pat. Off. .
91/14751  10/1991  WIPO .

OTHER PUBLICATIONS

Heinrich et al., "Metamorphosis of refrigerant filling", Chemical Abstracts, 119; 52251, 1992.

*Primary Examiner*—Christine Skane
*Attorney, Agent, or Firm*—Pravel, Hewitt, Kimball & Krieger

[57] ABSTRACT

An apparatus and method and refrigerant wherein ozone layer-damaging dichlorodifluoromethane is substituted with a mix of less environmentally damaging refrigerants chlorodifluoroethane and tetrafluoroethane in dichlorodifluoromethane-based air-cooling systems. While less environmentally damaging than dichlorodifluoromethane, the substitute refrigerant has a temperature-pressure relationship similar to that of dichlorodifluoromethane, making the substitute refrigerant suitable for use with dichlorodifluoromethane-based air-cooling systems. The refrigerant includes a lubricant which is compatible with dichlorodifluoromethane, chlorodifluoroethane and tetrafluoroethane.

4 Claims, No Drawings

ENVIRONMENTALLY SAFER REPLACEMENT REFRIGERANT FOR FREON 12-BASED REFRIGERATION SYSTEMS

BACKGROUND OF THE INVENTION

1. Field of the Invention

The present invention relates to the gradual replacement of ozone-damaging Freon 12® refrigerant with a refrigerant that is less damaging to the ozone layer in systems designed to use Freon 12®. More particularly the present invention relates to an improved refrigerant composition, method and apparatus for refrigeration wherein two non-Freon 12 refrigerants are mixed in a defined ratio such that the temperature-pressure relationship of the mix approximates that of ozone-damaging Freon 12®, especially at high operating temperatures. The mixture is compatible with Freon 12® so that it can be added to supplement and gradually replace ozone-damaging Freon 12®. A further particularity of the instant invention relates to an improved method and apparatus for refrigeration wherein refrigerant mixture is mixed with a soluble lubricating oil to provide lubrication to the apparatus. The lubricant is soluble in both the mixture of the invention and Freon 12® refrigerant.

2. General Background

Until recently, R-12 or dichlorodifluoromethane (hereinafter called "Freon 12®"); While Freon 12® is a trade name of E. I. du Pont de Nemours & Co. Inc. for dicholordifluoromethane, hereinafter "Freon 12®" is used in this specification to denote dicholorodifluoromethane, regardless of the source) was the major, if not sole refrigerant, used in automobile air-conditioners, refrigerators, freezers and window air-conditioning units.

Recently, however, Freon 12® has come under attack both nationally and internationally as an ozone layer-damaging chemical. In recent years, both the national and international scientific communities have linked Freon 12® with damage to the earth's protective ozone layer. Automobile air-conditioners, refrigerator/freezers and window air-conditioning units are believed to be a significant global source of ozone-damaging Freon 12®.

In response to both scientific concern and a national and global outcry over the use of Freon 12® in air-conditioning, the United States Congress has acted to first reduce and then ban the use of Freon 12® in air-conditioning units.

One of the first areas in which the use of Freon 12® is to be phased out is in automobile air-conditioning. As a first step toward phasing out the use of Freon 12® in automobile air-conditioning units, Congress is phasing out the use of Freon 12® in new automobiles and has banned the sale of Freon 12® in small retail quantities for the do-it-yourself air-conditioner recharger market.

However, at the time of this application, the vast majority of automobiles in use in the United States contain Freon 12®-based air-conditioning units, and approximately 40% of new automobiles continue to contain Freon 12®-based air conditioners.

Prior to banning the retail sale of small quantities of Freon 12®, owners of automobiles with Freon 12®-based air-conditioning units were able to recharge, or "top-off" the level of coolant in their automobile air-conditioners without the need for expensive professional service. Millions of units of Freon 12® recharging units were sold in the United States prior to being banned in January, 1994.

These Freon 12® recharger kits typically consisted of a 12 ounce aerosol can containing Freon 12®. The cans were fitted with an aerosol dispensing outlet that was compatible with a commercially available refrigeration manifold. In order to recharge an air-conditioning system, a customer needed to only fit the can to the manifold and discharge, or "drop in" the can's refrigerant charge directly into the air conditioning system, thus eliminating the need to bleed the system of existing Freon 12® before recharging.

Following Congress's ban on the retail sale of Freon 12® recharger kits, millions of automobile owners with Freon 12®-based air-conditioning units were left with no choice other than to seek expensive professional service to recharge their automotive air-conditioning units.

Also in response to Congress's ban on the use of Freon 12® in automobile air-conditioning, professional automotive service dealers began to retrofit existing Freon 12®-based air-conditioning units into new, non-freon 12 refrigerant-compatible units.

The refrigerant authorized by the Environmental Protection Agency (EPA) to replace Freon 12® in automobile air conditioners is tetrafluoroethane (hereinafter referred to as "134a"). Unfortunately, 134a has a markedly different temperature-pressure relationship at high operating temperatures than does Freon 12®.

Because of this difference in the temperature-pressure relationship of Freon 12® and replacement 134a, existing Freon 12®-based systems cannot simply be bled of Freon 12® and refilled with 134a. Were Freon 12® to be replaced by 134a in a non-retrofitted Freon 12®-based air-conditioning unit, the unit could not be operated at high temperatures because the significantly higher pressure of 134a over Freon 12® would damage the unit. Hence, non-retrofitted, Freon 12®-based units that are simply refilled with replacement 134a are inoperative at high operating temperatures; thus, inoperative at precisely the time that air-conditioning is most desired.

Further, simply mixing 134a with existing Freon 12® in order to replenish, or "top off" the level of coolant is not feasible. When 134a is mixed with Freon 12®, the mixture takes on the pressure characteristics of a higher pressure azeotrope, as opposed to Freon 12®. The temperature-pressure profile of 134a becomes markedly different from that of Freon 12® at temperatures within the high end of the normal refrigerant operating temperature range. Hence, replenishing lost Freon 12® with 134a in a Freon 12®-based air-conditioning system would lead to the same problems as the use of pure 134a in a non-retrofitted Freon 12®-based system: Damage to the system caused by 134a's high pressure at high operating temperatures.

In addition, 134a is insoluble with the lubricant used in existing, non-retrofit Freon 12®-based systems. Thus, mixing 134a with Freon 12® in a non-retrofit Freon 12®-based unit leads to loss of lubrication and subsequent damage to the system.

Hence, in the absence of Freon 12® recharger kits, owners of automobiles with Freon 12®-based air conditioners face but one choice when the level of their air-conditioning coolant was low: Professional service to—at a significant cost— to remove the existing Freon 12®, and retrofit the system to be compatible with 134a gas.

Prior to January, 1994, owners of the millions of automobiles with Freon 12®-based air-conditioning units had a choice of whether to merely top off the level of air-conditioning coolant with an inexpensive do-it-yourself Freon 12® recharger kit or to undergo an expensive retro-fitting process. However, at the time of this application, owners of automobiles with Freon 12®-based air-conditioners no longer have this choice. They must undergo expensive professional maintenance, or discontinue the use and enjoyment their automobile air-conditioners.

SUMMARY OF THE PRESENT INVENTION

The invention provides a method and apparatus that are environmentally sound alternatives to the use of Freon 12® as a refrigerant. More particularly, the invention provides a mixture of at least two refrigerants that are miscible with each other, and compatible with Freon 12® while at the same time possessing a temperature-pressure profile that approximates that of Freon 12® over the operating range of ambient temperatures usually encountered by air conditioning units or other apparatus utilizing Freon 12® as a refrigerant. The invention also provides a lubricant, that is compatible with both the environmentally sound refrigerant of the invention and also compatible with Freon 12®, so that mixtures of the refrigerant according to the invention and Freon 12® may be utilized with this lubricant in the refrigeration systems without deleterious effect upon moving parts of the refrigerating apparatus that require lubrication from the refrigerant.

More particularly, the invention provides a mixture of chlorodifluroethane and difluoroethane in specific proportions that provide a temperature-pressure relationship that approximates that of Freon 12® over the range of ambient temperature operating conditions in which Freon 12® is a useful refrigerant. More specifically, the refrigerant according to the invention comprises from about 15 to about 40 weight percent chlorodifluoroethane and from about 85 to about 60 percent tetrafluoroethane, based upon the total weight of chlorodifluoroethane and tetrafluoroethane. Preferably, the refrigerant includes from about 15 to about 20 weight percent chlorodifluoroethane and from about 85 to about 80 weight percent tetrafluoroethane. Most preferably, the refrigerant includes about 20 weight percent chlorodifluoroethane and about 80 weight percent tetrafluoroethane. In addition, the refrigerant according to the invention also includes from about 0.5 to about 2 weight percent (based on the weight of chlorodifluroethane and tetrafluoroethane) of a lubricating oil that is soluble in dichlorodifluoromethane, chlorodifluoroethane, and tetrafluoroethane. Preferably, the lubricant is selected from those lubricants sold by Royal Lubricants Company under the trademarks ROYCO® 783C or ROYCO® 783D. It should be understood, however, that other lubricating oils may also be used, as long as they are compatible with chlorodifluoroethane, tetrafluoroethane, and Freon 12®.

While it is intended that the substitute refrigerant according to the invention may be utilized to replace lost Freon 12® that has escaped from apparatus, the substitute refrigerant of the invention may also be utilized to completely refill apparatus that have been designed for use with Freon 12®, since the refrigerant has a temperature-pressure profile that closely approximates that of Freon 12®. Thus, when the refrigerant is used as a complete replacement for Freon 12®, it is no longer necessary that the lubricant should be compatible with dichlorodifluoromethane but only that it should be compatible with tetrafluoroethane and chlorodifluoroethane.

Further, whereas the substitute refrigerant of the invention is less damaging to the ozone layer than Freon 12® is useful in air conditioning units, and in particular automobile air conditioning units, it is not so limited in its use. Indeed, the refrigerant may be utilized as a substitute or replacement for Freon 12® in virtually any application, thereby eliminating the use of ozone layer-damaging Freon 12®.

In further specifics, the invention provides a canister containing a mixture of tetrafluoroethane and chlorodifluorethane that may be fitted with an outlet manifold that is compatible with a Freon 12® recharging manifold that is typically used to recharge an apparatus with the latter refrigerant. Refrigerant may then be allowed to flow from the container through the manifold and into the apparatus to replace Freon 12® refrigerant that has been lost from the refrigeration system or to completely fill the apparatus.

DETAILED DESCRIPTION OF THE PREFERRED EMBODIMENT

The present invention provides a mixture of non-Freon 12 refrigerants that are less damaging to the Earth's ozone layer and that are approved by the U.S. Environmental Protection Agency for use in air-conditioners. The invention mixture is compatible with Freon 12® and can be used to fill or "top off" existing Freon 12®-based refrigeration systems. It is expected that the present invention will gradually replace Freon 12® in Freon 12®-based air-cooling systems, without the need to remove Freon 12® from existing systems and without the need to retrofit existing Freon 12®-based systems for non-Freon 12 replacement refrigerants.

Specifically, the preferred embodiment includes a mixture of 142b and 134a refrigerants and a compatible lubricant such as ROYCO® 783C or 783D, provided under pressure in an aerosol can equipped with an outlet compatible with existing Freon 12® recharger kit manifolds, so that the can's refrigerant and lubricant mixture can be added on top of existing Freon 12® coolant in Freon 12®-based coolant systems. Also, the invention provides the possibility of using new refrigerant systems, originally designed for "Freon 12®," by supplying an EPA-approved refrigerant so that retrofitting for 134a use is not required.

In the most preferred embodiment, the invention provides an aerosol can like the standard 12 ounce can formerly used for containing "Freon 12®," but containing about 80% by weight 134a and about 20% by weight 142b. The can also contains the preferred lubricant, ROYCO® 783C or 783D in solution with the coolant mixture at a percent by weight of between 0.5% and 2%.

Existing Freon 12®-based air-conditioning systems use a small amount of a vegetable or hydrocarbon oil to lubricate the compressor. This oil has a very low vapor pressure, and is not soluble with either pure 134a or the 80/20% wt/wt mixture of 134a and 142b. Hence, adding 134a to replace Freon 12® in existing Freon 12®-based air-conditioning systems leads to compressor breakdown from lack of sufficient lubrication. The invention provides lubricants that are compatible with the invention mixture of 134a and 142b, and with "Freon 12®," and that are suitable for lubricating refrigerant compressors and other air-conditioner component parts. The most preferred ROYCO® 783C or 783D lubricants, on the other hand, are soluble in a 134a/142b mixture. This solubility allows the replacement refrigerant blend to lubricate the air-conditioning system, preventing damage to the compressor and component parts of the system.

EXAMPLE 1

Table 1 summarizes the results of solubility tests of a 2% by weight solution of either ROYCO® 783C or 783D lubricant (both gave identical results) in an 80/20% by weight mixture of 134a and 142b refrigerants. Either ROYCO® 783C OR ROYCO® 783D (available from Royal Lubricants Co. as MIL-H-6083EAM.1, NSN:9150-00-935-9808), containing red dye, was added to a clear Fisher-Porter pressure burette and a mixture of 134a/142b in an 80/20 ratio by weight was introduced under pressure to maintain the liquid state.

TABLE 1

| Full Burette | clear red, no separation |
| ⅔ Full Burette | clear red, no separation |
| ½ Full Burette | clear red, no separation |
| ⅓ Full Burette | clear red, no separation |
| Almost Empty Burette | clear red, no separation |

Note: The color of the fluid remained the same as the burette was emptied. The expelled gas deposited the oil onto a test panel, as shown by the red color.

EXAMPLE 2

In the invention, 134a and 142b are mixed at set ratios such that the temperature-pressure profile of the mixture is similar to that of Freon 12®, over the normal operating range of air-conditioners. Table 2 summarizes the results of tests of the temperature-pressure profiles of various mixes of 134a and 142b over the range of normal air-conditioner working temperatures, from 65° F. to 100° F.

For Table 2, different percentages of 134a and 142bp—by weight—were mixed and sealed in a container using a high pressure burette. The container was then submerged in a water bath for 5 minutes at each temperature. All pressure readings were taken three times and an average taken as the reported reading.

TABLE 2

PRESSURE IN PSIG OF INVENTION MIXTURE AT TEMPERATURE IN **F. AS COMPARED TO FREON 12 ® AND 134a

| MIXTURE OF | TEMPERATURE (F.) | | | | |
| --- | --- | --- | --- | --- | --- |
| 142b–134a wt % | 65 | 70 | 80 | 90 | 100 |
| 5%–95% | 68 | 74 | 86 | 95 | 128 |
| 10%–90% | 66 | 74 | 83 | 93 | 124 |
| 15%–85% | 66 | 71 | 82 | 92 | 123 |
| 20%–80% | 65 | 70 | 80 | 89 | 120 |
| 100% 134a | 76 | 79 | 90 | 100 | 134 |
| 100% Freon 12 ® |  | 70 | 84 | 100 | 117 |

As can be seen in Table 2, a range of about 15% to about 20% by weight of 142b and about 80% to about 85% by weight of 134a is preferred. The most preferred ratio is about 20% by weight 142b and about 80% by weight 134a. This is the ratio of 142b to 134a where the mixture of the invention shows the greatest similarity to "Freon 12®," especially at the higher operating temperatures. Significantly, at this higher temperature range the pressure of 134a in pure form is well above that of Freon 12® so that it would pose a hazard if used in equipment designed for using Freon 12®.

In the most preferred embodiment of the composition, the most preferred ratios of 134a and 142b are mixed with a preferred range of from 0.5% to 2% by weight of either ROYCO® 783C or 783D lubricant.

The apparatus and method of the preferred embodiment encompasses the use of a mixture of 134a and 142b at preferred ranges, as discussed above, with either ROYCO® 783C or 783D lubricant at preferred ranges, as discussed above (0.5–2% by weight) in the operation of an air-conditioning system, wherein the coolant-oil mixture gradually replaces Freon 12® in a Freon 12®-based refrigeration system.

The method and apparatus in the preferred embodiment further details providing the above described mix of 142b/134a and 783C/D in high strength, 2q aerosol containers. Where the containers are pressure sealed and fitted with an outlet compatible for existing Freon 12-type refrigeration regeneration manifolds.

EXAMPLE 3

A mixture of 19% by weight 142b, 79% by weight 134a and 2% by weight ROYCO® 783C was added to the cooling system of a 1987 Ford Taurus. This system was a Freon 12®-based cooling system that contained Freon 12®, but had a slow leak. As a result, the system had a low charge of Freon 12®, requiring "topping off."

When this system was fully charged with Freon 12® it normally ran a coolant pressure at the vacuum side of the system of 40 psig at 85° F. ambient temperature. Prior to applying the mixture according to the invention, the system showed 25 psig at the vacuum side of the system at 85° F. ambient temperature. Further, prior to the addition of the mixture, the accumulator did not show continuous condensation and air that passed over the evaporator was not chilled.

Approximately 12 ounces of the mixture was added to the system. Following this addition, the coolant pressure increased to 42 psig at the vacuum side of the system at 85° F. ambient temperature. Further, the accumulator began to show continuous condensation and the evaporation fan began to blow cold air, indicating cooling of air as it passed over the evaporator coil.

A similar charge of the mixture was added two more times over an eight month period. During this time the automobile was routinely operated in warm temperatures with the air-conditioning in use. Throughout this test period, the air-conditioning system maintained pressure, continuous condensation and blew cold air. During the length of the eight month test period, the temperature of the air exiting the cold air vent was acceptably cool and averaged 43° F.

Further, it was noted that the system ran more smoothly and the compressor showed less vibration during the test period, as the mixture of the invention was added. It is theorized that the lubricating oil, being soluble in the refrigerant gasses, was better able to lubricate the rotating wobble plate and reciprocating parts than the existing Freon 12® lubricant. Engine efficiency and gasoline milage did not vary.

As used herein, "tetrafluoroethane" refers to refrigerant 134a (1,1,1,2-tetrafluoroethane).

ROYCO® 783c and ROYCO® 783D are trademarks of Royal Lubricants Company Inc., E. Handover, N.J., for lubricants having the following composition:

60–80% hydrotreated light naphthenic distillate,

10–20% acrylic polymer in severely hyrotreated mineral oil,

5–15% solvent refined light naphthenic distillate petroleum,

2–7% additive containing barium dinonylnaphthalene-sulfonate,

<0.5% butylated triphenyl phosphate, and

<2% minor additive.

It should be understood that variations and modifications may be made of the invention herein taught, and that those are within the scope and spirit of the invention as taught above and claimed herebelow.

What is claimed as invention is:

1. A refrigerant consisting of:
   about 15% to about 40% by weight chlorodifluoroethane;
   about 60% to about 85% by weight tetrafluoroethane; and
   about 0.5% to about 2% by weight of the refrigerant of a lubricating oil that is soluble in dichlorodifluoromethane, chlorodifluoroethane and tetrafluoroethane, the lubricating oil having the following composition:
   60–80% hydrotreated light naphthenic distillate,
   10–20% acrylic polymer in severely hyrotreated mineral oil,
   5–15% solvent refined light naphthenic distillate petroleum,
   2–7% barium dinonylnaphthalenesulfonate and
   <0.5% butylated triphenyl phosphate.

2. A refrigerant according to claim 1 wherein said chlorodifluoroethane is present in an amount of about 20% by weight and said tetrafluoroethane is present in an amount of about 80% by weight.

3. A refrigerant according to claim 1 wherein said chlorodifluoroethane is present in an amount of about 15% to about 20% by weight and said tetrafluoroethane is present in an amount of about 80% to about 85% by weight.

4. A refrigerant according to claim 1 wherein said chlorodifluoroethane is present in an amount of about 40% by weight and said tetrafluoroethane is present in an amount of about 60% by weight.

* * * * *